United States Patent
von Arx et al.

[11] 3,718,818
[45] Feb. 27, 1973

[54] MEASURING CERENKOV RADIATION PRODUCED BY CHARGED PARTICLES PASSING THROUGH A GAS AS INDICATIVE OF THE ENERGY OF THE CHARGED PARTICLES

[75] Inventors: Arnold von Arx, Olten; Klaus Kuphal, Staretschwil, both of Switzerland

[73] Assignee: Aktiengesellschaft Brown, Boveri & Cie, Baden, Switzerland

[22] Filed: Sept. 24, 1970

[21] Appl. No.: 75,147

[30] Foreign Application Priority Data

Sept. 29, 1969 Switzerland..................14624/69

[52] U.S. Cl..............................250/71.5 R, 250/84.5
[51] Int. Cl..............................................G01t 1/20
[58] Field of Search..............250/71.5 R, 83.6 S, 84.5

[56] References Cited

UNITED STATES PATENTS

| | | | |
|---|---|---|---|
| 2,562,968 | 8/1951 | Teichmann et al. | 250/83.6 S |
| 2,950,391 | 8/1960 | Brumley et al. | 250/71.5 R |
| 3,082,326 | 3/1963 | Arnold | 250/84.5 |
| 3,176,136 | 3/1965 | Hopkinson | 250/84.5 |

OTHER PUBLICATIONS

Gas Cerenkov Counters, by Atkinson et al. from Review of Scientific Instruments, Vol. 30, No. 10, October 1959, pgs. 863–868.

*Primary Examiner*—Archie R. Borchelt
*Attorney*—Pierce, Scheffler & Parker

[57] ABSTRACT

A device for determining the energy of electrically charged particles emanating from a particle accelerator such as a Betatron used for radiation therapy includes a gas interval traversed by the accelerated particles for producing a Cerenkov radiation whose optical index of refraction is variable. First and second adjacently located detectors are disposed in the path of Cerenkov radiation, both of these detectors being exposed to the same dispersed and secondary particle radiation but one detector being shielded from the direct Cerenkov radiation. The respective outputs from the detectors are led through amplifiers whose amplification factors are adjustable into a difference meter, and the output of the difference meter is applied to a measuring instrument.

2 Claims, 3 Drawing Figures

Inventors
Arnold von Arx
Klaus Kuphal

By Pierce Scheffler & Parker
Attorneys

MEASURING CERENKOV RADIATION PRODUCED BY CHARGED PARTICLES PASSING THROUGH A GAS AS INDICATIVE OF THE ENERGY OF THE CHARGED PARTICLES

The present invention relates to a device for determining the energy of electrically charged particles from accelerators for radiation therapy, which comprises a gas interval traversed by the particles for the purpose of producing a Cerenkov radiation and whose optical index of refraction is variable.

Such devices are known in nuclear metrology (e.g. U.S. Pat. No. 3,140,394 or Nuclear Instruments and Methods 6 (1960) 209–212). Here the optical index of refraction of the gas traversed by the electrically charged particles and emitting Cerenkov radiation is varied by variation of the pressure, and the intensity of the Cerenkov radiation is measured. As the threshhold value of the particle energy for the start of the Cerenkov emission varies with the index of refraction, the energy of the charged particles can be determined from the measured curve.

The use of the known devices in particle accelerators for radiation therapy is not known, probably because the power fluctuations of the accelerator radiation and the parasitic radiation, shieldable only at very considerable cost, falsify the measurements too much. On the other hand, it is indispensable in radiation therapy to know the energy of the particles and in particular the energy distribution within the accelerator ray exactly. One has tried heretofore to obtain this knowledge by range measurements, measurements of the threshold energy of nuclear photo-effects and the like. These measuring methods, however, are not only complicated but also inaccurate.

The object of the invention therefore is to improve a device of the above described kind in such a way that it can be used in a simple and appropriate manner for the energy measurement of particles in beams from accelerators for radiation therapy.

This problem is solved in that a detector for the Cerenkov radiation is provided, and close to it a second, similar detector shielded from the Cerenkov radiation, whose outputs are connected over at least one setting member for adjusting the magnitude of the output signals to a difference meter.

Advantageously the setting members are so adjusted, by hand or automatically via a control circuit, that the output signal of the difference meter is zero. As setting members there enter into consideration, for example, amplifiers with adjustable degree of amplification.

It is achieved by such a compensation measuring method that power fluctuations of the accelerator ray, ionizing interference radiation, and extraneous light influences in the measuring signal are eliminated, it being important that the shielded detector measures, not the Cerenkov radiation, but the interference radiation proportional to the power fluctuations.

Further details of the invention will become evident from the examples of execution explained below with reference to the accompanying drawings wherein.

Figure 1:
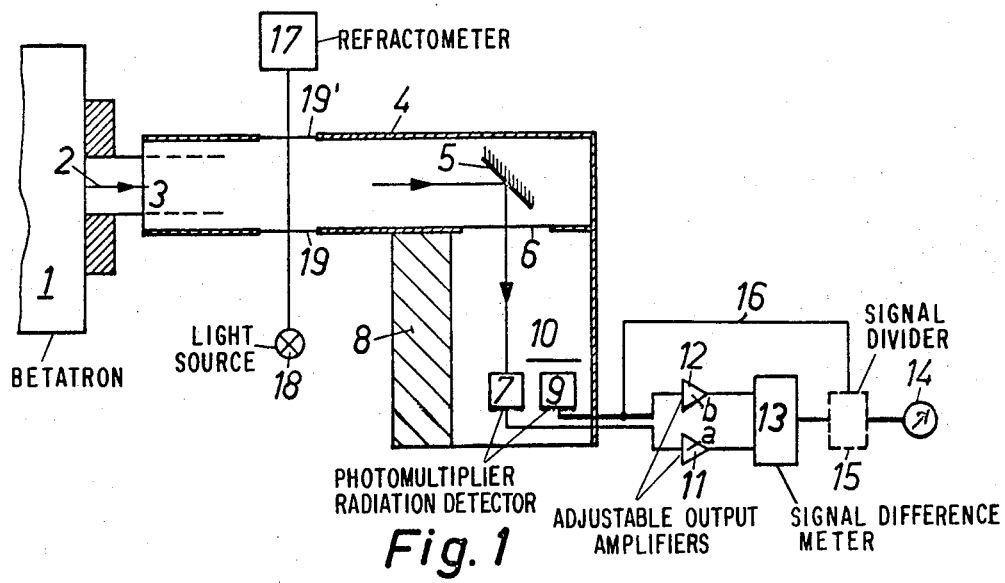
FIG. 1 is a diagrammatic axial section of a device according to the invention.

In FIG. 1 is indicated a particle accelerator 1, e.g. a betatron, from whose collimator an electron beam 2 passes through a window 3 having the best possible electron transmission into a vessel 4 which is filled with gas. The gas can be varied, for example, in its composition, by defined admixture of other gases, or also its pressure can be reduced by means of a pump, for example in the range between 10 and 760 Torr, or increased beyond 760 Torr. The window must be as thin as possible and consist of a material of low atomic number, whereby energy loss and blurring are kept small.

In their flight through the gas interval, the electrons produce Cerenkov light, whose direction practically coincides with that of the electron trajectory. The light is reflected by mirror 5 through the light-transmitting window 6 onto a photosensitive detector 7, e.g. a photomultiplier. The latter is protected by a shield 8 from the primary electrons. Yet it is inevitable that it reacts to dispersed and secondary radiation as well as the light. To compensate this component according to the invention, there is arranged, close to detector 7, a detector 9 identical therewith, which is exposed to as nearly the same dispersed and secondary radiation as possible. It is shielded from the Cerenkov light by the light-opaque shield 10. The electric signals produced in the detectors 7 and 9 are passed through the similar, adjustable output amplifiers 11 and 12 with the amplification factors a and b and subtracted from one another in the difference meter 13. The difference is indicated by a measuring instrument 14.

The measurements are then carried out preferably in such a way that the index of refraction $n$ of the gas interval is increased from a value at which Cerenkov emission does not yet occur, until Cerenkov emission starts. Through the equation $v = c/n$ ($v$ = velocity of the particles, $c$ = absolute velocity of light) the particle energy can then be determined very accurately, if $n$ is known. On further increase of $n$, the intensity of the Cerenkov-light is then measured. Conversely, after determination of $n$, the accelerator may be accelerated at fixed $n$ to increase the energy of the particles to start of the Cerenkov emission and then beyond that. This procedure is taken as a basis by way of example for the following further elucidation of the invention. If the deviations from the normal conditions are not too great, $n$ can be read very accurately from tables as a function of the gas composition, pressure, temperature, and mean light wave length. The dependence of the index of refraction on the wave length of the light is, as a rule, negligible because of the limited sensitivity range of light meters. Instead of determining the optical index of refraction $n$ on the basis of pressure, temperature, and gas composition measurements by means of tables, it can be determined by a refractometer or the like assigned to the gas interval. Also the determination of $n$ by means of laser interferometry enters into consideration.

To compensate, according to invention, the effect of fluctuations of the electron radiation power, to which the secondary radiation power and the Cerenkov light intensity are proportional, and also any possible non-linearities of the electrical elements, a null method is employed for measuring. In doing this, for each energy value $E$ one of the two amplification factors ($a$ or $b$) of the setting members 11, 12 is varied until the value 0 is indicated by the measuring instrument 14. For zero balancing for $E < E_s$ ($E$ =instantaneous electron energy, $E_s$ = threshold energy for start of Cerenkov emission) it will in general be necessary to adjust values $a_o \neq b_o$.

The term ($b/a - b_o/a_o$) then no longer depends on different radiation powers of the accelerator. It is proportional to the energy-dependent factor of the term for the intensity of the Cerenkov light and, for $E > E_s$, it is proportional to $E - E_s$ in good approximation. The length of the irradiated gas interval, to which the Cerenkov-light-intensity is likewise proportional, enters in the measurement as a constant factor.

It is of importance for the above described measuring method that shield 8 does not entirely screen off the secondary radiation. For this case, and if also the dispersed radiation were below the measurement limit, the signal of detector 9 would be equal to zero and elimination of the effect of the power fluctuations would not be possible.

Figure 2:
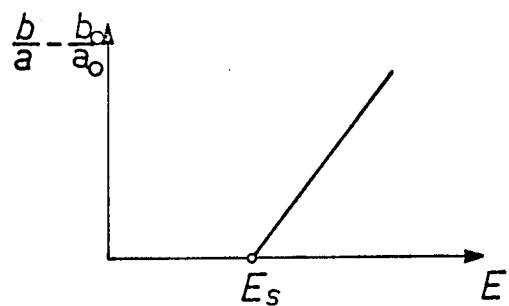
fig. 2 is a curve plot showing the dependence of the measured intensity of the Cerenkov radiation on the particle energy for monochromatic electrons.

FIG. 2 illustrates the amplifier ratio $b/a - b_o/a_o$. At $E$-values below the threshold energy $E_s$, $b/a$ equals $b_o/a_o$, above it, $a$ is the smaller in relation to $b$ as $E - E_s$ becomes greater. The function $b/a - b_o/a_o$ in dependence upon ($E$) represents proportionally the start and increase of the Cerenkov-light-intensity I with increasing electron energy.

The value of the threshold energy $E_s$ for electrons is, under normal conditions, 22 MeV for example in air, 60 MeV in helium, 17 MeV in carbon dioxide, 9 MeV in pentane. By mixing for example helium and air, values between 22 and 60 MeV are thus adjustable. If one further deviates from the normal conditions, the threshold energy can be varied in the entire electron energy range used in radiation therapy.

It is a disadvantage of the above described compensation method that the null balancing must be done anew for each energy value of the curve by adjusting $a$ or $b$. This can be avoided by dividing the difference signal formed in the difference meter 13 further by a signal proportional to the signal of detector 9. The null balancing ($b/a = b_o/a_o$) is then done only once for $E - E_s$, and a value proportional to the energy-dependent factor of I can now be read on the instrument 14 directly as E increases. The division can be effected for example by an electronic circuit 15 known from analog computing, which follows the difference meter 13 and precedes instrument 14, and is connected through a line 16 with the output of detector 9.

Besides, there is indicated diagrammatically in FIG. 1 a light source 18, from which the gas interval can be transilluminated through windows 19, 19' which as a rule are optically especially adapted, so that the index of refraction $n$ of the gas can be determined by means of a refractometer or the like 17 which receives the light from the source 18 after passage transversely through the gas interval.

Figure 3:
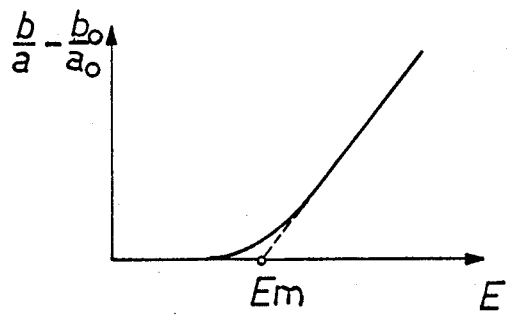
FIG. 3 is a curve according to FIG. 2 e.g. electrons of a finite energy band width.

The curve shown in FIG. 2 for the Cerenkov-light intensity as a function of the particle energy is valid only for monochromatic electrons. If, however, the electrons in the accelerator beam have different energies, the intensity curve will show a rounded ascent, as illustrated in FIG. 3. The curve shown had been obtained by measuring and plotting the Cerenkov-intensity values for an electron beam of finite energy band width traversing the gas interval by means of one of the above balancing methods.

By extrapolation of the linear part of the curve downward, the center of mass energy $E_m$ of the energy distribution can be calculated. From the beginning and end of the curved portion of the curve there can further be determined maximum and minimum energy of a limited energy distribution, and the curvature of the curve is in all points proportional to the corresponding values of the energy distribution. Thus, there results an exact knowledge of the energy blurring, for example, due to electron field-compensation bodies used in particle accelerators for radiation therapy.

As the direction of the emitted Cerenkov light coincides for $E \approx E_s$ with the flight direction of the electrons, also the latter can be determined advantageously, namely from detector and mirror position. It is possible in this manner to determine the virtual focus of the electron beam of accelerators for radiation therapy.

The device according to the invention can be used advantageously also for controlling an accelerator to a certain nominal energy. For this purpose, it is best to place the working point in the linear section of the light intensity-energy curve, because there any energy fluctuation upward and downward results in a great intensity fluctuation upward or downward, which can be used to control the electron extraction mechanism in the accelerator.

We claim:

1. In a device for determining the energy of electrically charged particles emanating from an accelerator for use in radiation therapy, the combination comprising means providing a gas interval traversed by the particles for producing a Cerenkov radiation and whose optical index of refraction is variable, a first detector receiving said Cerenkov radiation, a second detector similar to and located adjacent said first detector which is exposed to the same dispersed and secondary radiations as said first detector but which is shielded from the direct Cerenkov radiation, means connecting the output signals from said first and second detectors to a difference meter through adjustable setting members for adjusting the magnitude of said output signals, and a dividing circuit connected with the output of said difference meter and with the output of said second detector and which functions to divide the difference signal at the output of said difference meter by a signal proportional to the output signal of said second detector.

2. A device as defined in claim 1 wherein at least one of said setting members is adjusted below the threshold energy for start of Cerenkov emission such that the output signal from said difference meter is zero and that the respective setting value is maintained during measurement above said threshold energy whereby the output signal of said dividing circuit is a direct indication of the Cerenkov radiation energy.

* * * * *